A. B. C. NUSBAUM.
Cultivator.
No. 100,183. Patented Feb. 22, 1870.
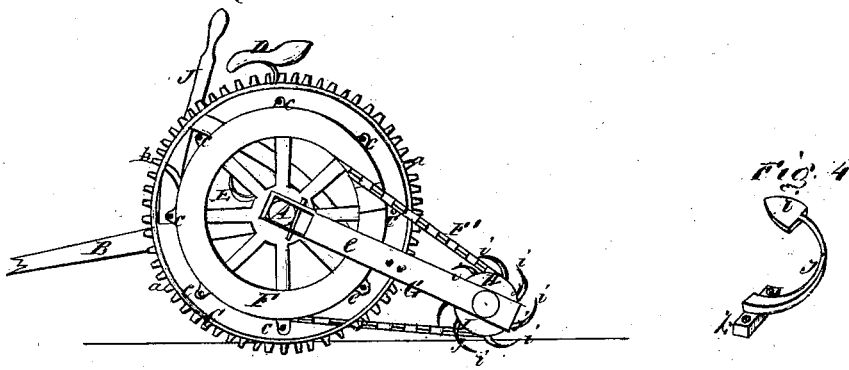
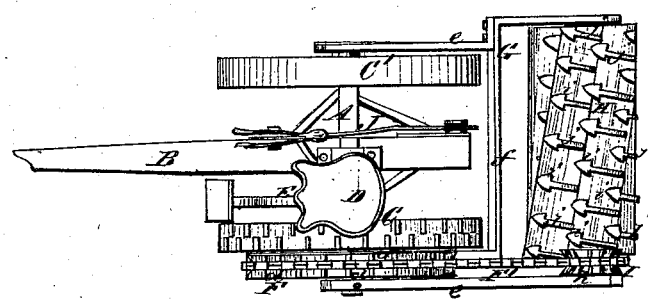
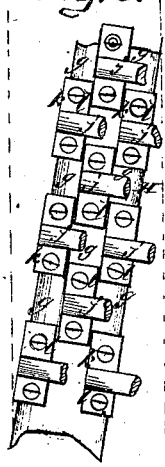
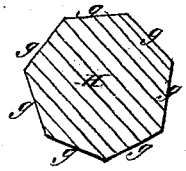
Witnesses
A. W. Macdonald
Geo. J. Mauton
Inventor
A. B. C. Nusbaum
per A. P. Haight
Attorney

United States Patent Office.

A. B. C. NUSBAUM, OF SACRAMENTO, CALIFORNIA.

IMPROVEMENT IN CULTIVATORS.

Specification forming part of Letters Patent No. 100,183, dated February 22, 1870.

*To all whom it may concern:*

Be it known that I, A. B. C. NUSBAUM, of Sacramento, in the county of Sacramento and State of California, have invented a new and Improved Cultivator; and I do hereby declare that the following is a full, clear, and exact description of the same, reference being had to the accompanying drawings, and to the letters of reference marked thereon, making a part of this specification.

This invention relates to a new and improved device for cultivating the soil to render the same loose and friable, eradicate weeds, &c., and is of that class in which a rotary cylinder or drum is employed having teeth or shovel-shares attached. This class of agricultural implements has been constructed in various ways to suit the character of the work for which they were designed, and also has had different names applied to them appropriate to the work required to be performed. Some have been designed especially for digging, to supersede the plow, and have been termed "rotary diggers." Others, again, have been constructed with a view of scarifying meadows which have become moss-bound, and have been termed "rotary scarifiers."

My invention is designed to loosen up, pulverize, and render the soil friable, eradicate weeds, &c., and is intended for operation on stock ground.

The invention consists in a peculiar manner of attaching the teeth or shares to the rotary cylinder, together with the attachment or application of the same to the frame of the machine, and the manner of driving the toothed cylinder.

The object of my invention is to dispense with all gearing, as that rapidly cuts and wears, owing to the adhesion of sand and gritty soil between the cogs. Besides, as in my case, where it is required to have the cylinder rotate in the same direction as the traction or driving wheel of the machine, an intermediate gear would be required between the gear on the driving-wheel and the gear on the toothed cylinder, thus adding to the complexity, expense, and draft of the machine.

In the accompanying sheet of drawings, Figure 1 is a side view of my invention; Fig. 2, a plan or top view of the same; Fig. 3, an enlarged portion of the toothed cylinder of the same; Fig. 4, an enlarged and detached perspective view of a tooth or share of the cylinder; Fig. 4, an enlarged transverse section or end view of the toothed cylinder, the teeth being detached.

Similar letters of reference indicate corresponding parts in the several figures.

A represents the axle of the machine, which is fixed, being permanently attached to the draft-pole B, the wheels C C′ being placed loosely on the axle, one of the wheels, C—the driver—being provided at its periphery with transverse ribs or projections $a$ in order to prevent slipping.

D is the driver's seat, attached to a yielding support, E, which has a foot-board, $b$, secured to it. To the driving-wheel C a pulley, F, is attached concentrically by bolts $c$ or otherwise. The periphery of this pulley has a V concave provided with transverse ribs $d$, between which the links of a chain, F, catch, to insure said chain serving as an efficient driving medium for the toothed cylinder, hereinafter described.

G represents a swinging frame, composed of two arms, $e\ e$, connected by a cross-bar, $f$. The front ends of the arms $e\ e$ are fitted loosely on the ends of the axle, so that they may work freely thereon, and the arms or journals of the axle work freely in the arms of the swinging frame. Between the rear ends of the arms $e\ e$ of this swinging frame there is placed a cylinder, or rather a polygon, H, having seven (more or less) faces or sides, $g$, of equal width, and having an oblique or spiral position on the cylinder or polygon. (See Fig. 3, in which the dotted lines represent the diameter of the cylinder or polygon.) On one end of this cylinder or polygon there is keyed a pulley, I, which, like the pulley F of the driving-wheel C, has a V-concave periphery with transverse ribs $h$, over which the chain F′ works. By this means the cylinder or polygon is rotated with certainty, equally so as if gearing were employed, as the chain cannot slip on the pulleys F I.

The cylinder or polygon H has a series of teeth or shovel-shares, $i$, attached to its oblique or spiral faces or sides $g$, as follows: These teeth or shares are attached to or formed or cast with shanks $j$, which are of curved form, about semicircular, as shown in Fig. 4. The teeth or shares are of shovel shape—that is to say, are of pointed form with rounded sides— as also shown in Fig. 4. The shanks $j$ are provided with a rectangular base, $k$, through which screws or screw-bolts $l$ pass into the cylinder or polygon, and secure the shanks $j$, and consequently the teeth or shares $i$, to the cylinder or polygon. The shanks $j$ on one side or face $g$ are opposite the centers of the spaces between the shanks of the adjoining sides or faces, and this disposition of the teeth and shanks, in connection with the oblique or spiral position of the same on the cylinder or polygon, insure an easy continuous operation of the teeth or shares in the soil. There is an absence of all jerks, concussions, jars, &c., which would cause considerable wear and tear of the working parts of the machine, and have a great tendency to jade the draft-animals and increase the draft of the machine. The toothed cylinder or polygon may be elevated free from the soil at any time by operating a lever, J, attached to the draft-pole, and so formed that its handle will be within convenient reach of the driver on his seat D.

It is designed in practice to have the machine constructed principally of metal. The draft-pole, of course, will be of wood; but the other parts composing the frame-work may be entirely of iron, or iron and wood combined. The teeth or shares will be of cast-iron, wrought-iron, or steel. I do not, however, confine myself to any particular material for the construction of any of the parts.

I do not claim, broadly, a rotary cylinder provided with teeth or shares, irrespective of the peculiar construction and the mode of operating or driving the same, as herein shown and described; but What I do claim as new, and desire to secure by Letters Patent, is—

1. The rotary cylinder or polygon H, having its teeth or shares attached to it, as shown and described, when said cylinder or polygon is fitted within a swinging frame connected to the axle A, as described, and driven or rotated from the driving-wheel C through the medium of a chain, F', fitted over pulleys F I, having concave peripheries provided with transverse ribs, substantially as shown and described.

2. The combination of the swinging frame G, cylinder or polygon H, with spirally-attached teeth, and driving-chain F, working over the pulleys F I, when all are constructed and applied to and used in connection with a suitable frame mounted on wheels C C', one of which is used as a driver, substantially as herein shown and described.

A. B. C. NUSBAUM.

Witnesses:
E. A. VERRILL,
H. H. HOLTON.